May 28, 1940.  V. LOUGHEED  2,202,014
AIR PROPELLER BLADE AND MATERIAL FOR MAKING SAME
Filed Feb. 10, 1938
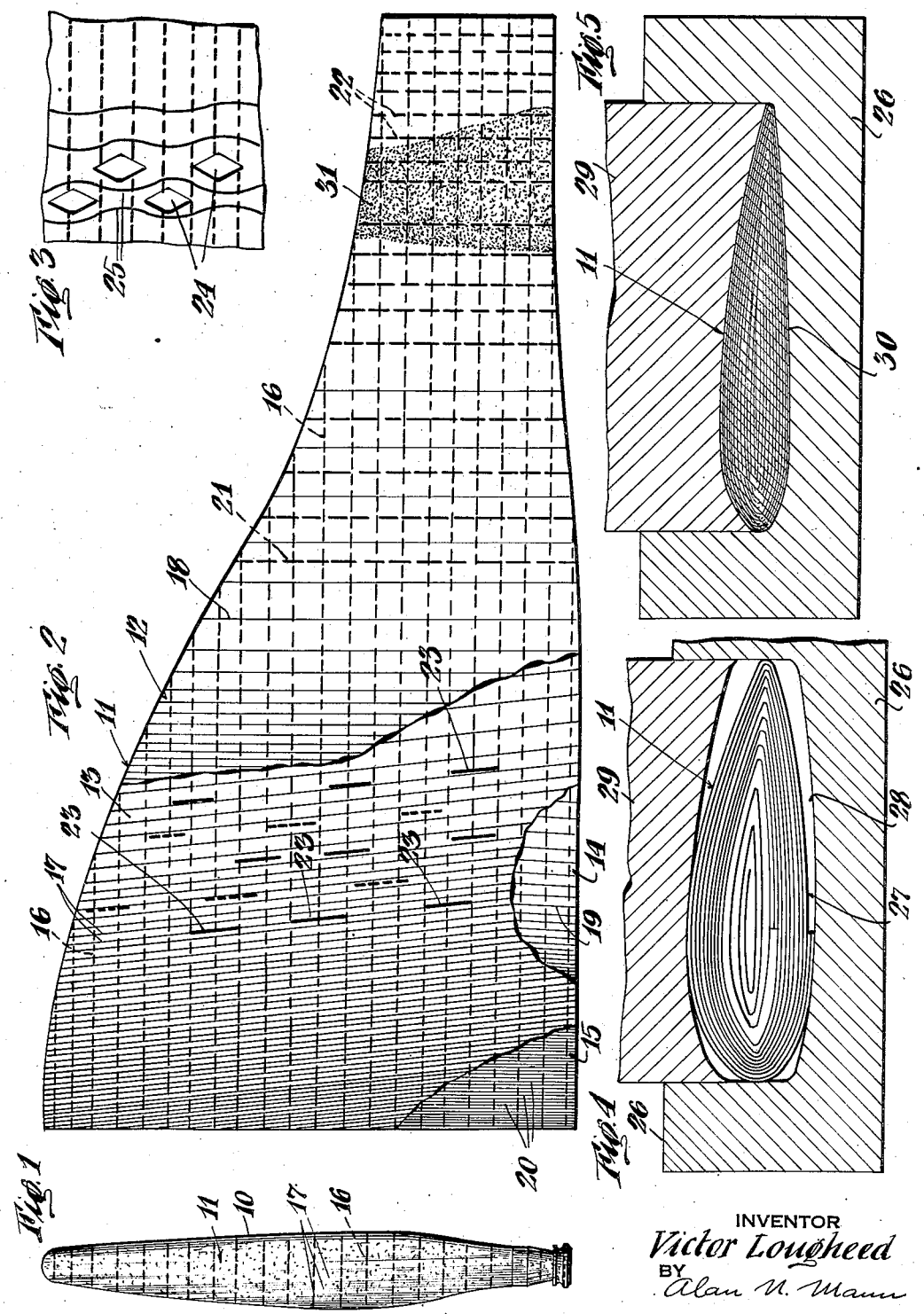
INVENTOR
*Victor Lougheed*
BY
*Alan N. Mann*
ATTORNEY Patented May 28, 1940

2,202,014

UNITED STATES PATENT OFFICE 2,202,014

AIR PROPELLER BLADE AND MATERIAL FOR MAKING SAME

Victor Lougheed, Lucketts, Va.

Application February 10, 1938, Serial No. 189,719

14 Claims. (Cl. 170—159)

My invention relates to the manufacture of air propeller blades and more particularly to the fabrication of such a blade from molded sheets of preformed, woven material impregnated with plastic.

Most of the air propeller blades in commercial use today on the larger aircraft are solid blades made in one piece from some metal alloy such as aluminum or magnesium alloys. These blades are not entirely satisfactory since they are subject to failure under high speed operation, such failure almost invariably resulting in serious accident. Experience with these blades, which are chiefly loaded by excessive vibration and enormous centrifugal force, shows that a slight scratch on the surface tends to develop into a crack which under working conditions results in the whole or a portion of a blade vibrating off or flying off, thereby so radically unbalancing the revolving propeller and the motor as to cause instant disaster to the aircraft.

There are generally two possible solutions for this propeller problem. One is to strengthen blades in a higher degree than such strengthening renders them heavier. The other is to lighten them in greater degree than lightening renders them weaker. An ideal compromise would be to strengthen while lightening the blade.

The ultimate strength of the best approved aluminum alloy used in air propeller blades is about 55,000 pounds per square inch; the yield point is only 35,000 pounds; and the fatigue limit is not higher than 15,000 pounds. For safety purposes it would be desirable to increase these values substantially, for example, an increase in the ultimate strength to 100,000 pounds per square inch or more, while maintaining the density of the blade at not more than about 2.6. Previous attempts to do this, however, have resulted unsatisfactorily because they have involved the use of substantially heavier materials made hollow, and fabricated in ways that conduce to failure.

An object of my invention is to provide a solid air propeller blade that has unusually high strength and low mean density.

The material used for forming the air propeller blade of my present invention may be generally of the type disclosed in my copending application Serial No. 184,797, filed January 13, 1938, in which small diameter steel wires are interwoven with organic fiber threads to form webs and these webs are impregnated with a raw or unmolded plastic material such as a phenol-formaldehyde resin. The material preferred for use in the present invention is a broad web, and has special distribution and arrangement of the steel wires and organic fibers, as explained hereinafter.

This plastic, impregnated material, in accordance with my invention, is first cut or trimmed into pile-up patterns contrived to distribute the mass of the material to correspond to the desired varying mass of the finished blade from tip to tip. This normally requires elongated, irregularly shaped sheets of material of varying width. The properly cut material is next arranged by rolling or folding the material into the general form of the desired blade, with or without the use of a mandrel or core. This preformed material finally is placed in a closed mold and heat and pressure applied to cause the resin to polymerize or soften and the several layers of material to be compressed and aggregated into the final blade form.

To obtain proper distribution of the mass of the material forming the propeller blade, it is necessary that certain portions of the material, particularly those forming the center or sections of the blade where the peripheries are the greatest but where the cross-sectional areas are not the greatest, be capable of stretching more than the other portions that form the root and tip sections of the blade. This desired condition is accomplished by a certain feature of my invention, namely slitting of the organic fibers of the blade material at suitable staggered intervals to permit the material to stretch or distort at these points without, however, coming wholly apart, thereby increasing the effective length of the slotted portions of the material when it is rolled, folded or otherwise arranged into the blade form.

The novel features of my invention are set forth with particularity in the appended claims. The invention itself, however, both as to organization and method of operation will be clearly understood from the following description taken in conjunction with the accompanying drawing, which illustrates the blade material and general method of fabricating my improved air propeller blades, and in which:

Fig. 1 is a plan view of the completed air propeller blade;

Fig. 2 is a plan view, with portions broken away, showing several layers of the reinforced plastic material from which the air propeller blade is formed.

Fig. 3 is an enlarged view of a stretched portion of the material shown in Fig. 2 having some of the fiber threads cut to permit distortion;

Fig. 4 is a sectional view of a mold and the preformed reinforced plastic material arranged therein before compressing; and Fig. 5 is a sectional view of the mold and plastic material after the material has been compressed and heated to form the propeller blade.

Referring now to the several figures it will be noted that the air propeller blade 10 shown in Fig. 1 is formed from sheets of the reinforced plastic material 11, illustrated in Fig. 2, by rolling or otherwise forming this material into the general shape of the air propeller blade, placing this preformed material in the mold shown in Figs. 4 and 5, and then applying heat and pressure to the mold to form the final blade as illustrated in Fig. 5. In the usual case, the air propeller blade 10 will be formed from a relatively large number of the irregularly shaped sheets of reinforced plastic material 11, illustrated in Fig. 2. For purposes of illustration, only four of these sheets are shown in Fig. 2, as indicated at 12, 13, 14 and 15. Each of these sheets comprises a plurality of organic fibers, such as for example cotton threads, which constitute the warp of the web or fabric material and run continuously from one end of the material to the other as indicated by the horizontal dotted lines 16 in Fig. 2.

The filler or woof elements of the web material are formed predominantly of small diameter steel wires such as indicated at 17, 18, 19, and 20 in the four layers of material shown in Fig. 2. Along certain portions of the reinforced material 11, however, some of the filler elements are made of cotton thread or other organic fiber as shown at 21. Along still other portions of the reinforced material 11 the filler elements are composed entirely of the organic fiber threads such as shown at 22 in Fig. 2. From this identification it will be noted that the narrow portion of the elongated strip of material, shown toward the right of Fig. 2, consists entirely of organic fiber threads which form the warp and filler elements. The central portion of the material has organic fiber warp elements, which are common to the entire material, and a mixture of fiber threads and steel wires as the filler element; and the wide portion of the material, shown at the left hand end of Fig. 2, has organic fiber woof elements, and steel wire for all of its filler elements.

It also will be noted from the four sheets or layers of material indicated at 12, 13, 14, and 15 in Fig. 2 that the individual steel wire filler elements are arranged substantially parallel to each other in the individual sheets but the wires as a whole in each sheet are arranged at a slight angle to the wires in the adjacent sheets. This arrangement of wires in the several sheets confers greater strength to resist splitting, to the air propeller blade formed from these several sheets, than if the wires in adjacent sheets were exactly paralleled.

In the preferred embodiment shown in Fig. 2, it will be noted that the width of the reinforced material which is to form the propeller blade is substantially equal to the height or length of the finished blade shown in Fig. 1. The pattern of the material shown in Fig. 2, including the exact outline of its periphery, is determined by computation based upon the desired dimensions and volumes of the blade portions that are to be constituted from this material. The number of layers or sheets of material used for forming the blade will likewise depend upon the desired volumetric and other dimensions of the blade, as also upon the thickness and other dimensions of the individual sheets. Each of these sheets is impregnated with a suitable raw or unmolded plastic material, indicated at 31, advantageous examples of which are the well known phenol-formaldehyde condensation resins. The resin may be applied to the sheet material, consisting of organic fiber threads and small diameter steel wires woven in the desired manner as described above, by any suitable means such as for example, dipping, brushing, spraying, or the like. The resin may be applied to the sheet material either before or after it is cut to the necessary pattern such as indicated in Fig. 2. It may be supplemented by additional resin placed loose in the mold, as, for example, in powder or sheet form.

The method of forming the air propeller blade from the reinforced plastic sheet material shown in Fig. 2 is subject to several variations. In the usual case the material is rolled up, without any mandrel or core, into the vaguely general shape of the final blade, starting at the narrow end of the material which preferably contains no steel wires but consists entirely of organic fiber filler and warp threads such as indicated at the right hand end of Fig. 2. When the material is rolled up from this end the narrower portion will naturally form the core of the ultimate blade; intermediate portions of the material, consisting of organic fiber warp threads and mixtures of steel wire and organic fiber filler threads, will form intermediate portions of the blade; and the widest portion of the material, in which all or most of the filler elements are made of steel wire, will form the thus strongly reinforced outermost layers or skin of the blade. When rolled up in this manner, the material will be in the general form indicated at 27 in Fig. 4, and may be provided with a root plug to help secure the blade in a hub.

If it is required to preform the blade upon a templet or mandrel, this may be done by rolling the reinforced material shown in Fig. 2, around such a mandrel made of stiff, elastic steel wire formed in the shape of a hairpin. After the rolling operation is completed, and before the material is placed in the mold, the hairpin-like mandrel may be withdrawn. Also, if it is desired to use a permanent blade core as a former, and to cover this former with the reinforced material, this may be done by winding the material around such a hollow blade form, and a core thus provided in the finished blade by injection of molten plastic material into the hollow former, in a manner described in my copending application Serial No. 184,798.

In rolling up the reinforced material about itself or around a mandrel to form the propeller blade, or winding the material around a blade former as described above, it will be found that the center portions of the material will have to stretch or extend further than the end portions of the material, which form the thin tips of the blade, or else the desired smooth contour of the blade, with complete filling of the mold cannot be obtained. I have found that this requirement can be met, as suggested above, by cutting the organic fiber threads by slitting the web at intervals along the portion of the material where the increased stretch or effective length is required. This procedure is indicated by the slits shown at 23 in Fig. 2 and by the amplified view of the distorted material shown in Fig. 3. It will be noted from the illustration in Fig. 3 that when the organic fiber threads are cut as described and the material stretched longitudinally it will distort into the diamond shaped openings 24. The steel wires that form the filler elements of the material along the slotted portions are not cut, but because of the cutting of the adjacent fiber threads the arrangement of these steel wires becomes distorted as indicated at 25 in Fig. 3.

After the reinforced material is rolled, folded, or otherwise suitably formed or packed into the general shape of the final air propeller blade, it is placed in a positive mold 26 shown in Fig. 4. The preformed material indicated generally at 27 loosely fills the mold cavity 28. The mold 26 is heated to a suitable temperature to effect polymerization of the resin or plastic used, such required temperature not harming the other constituents of the reinforced plastic material.

To convert the preformed reinforced plastic material into the final blade form, the plunger or pressure member 29 of the mold 26 shown in Figs. 4 and 5 is now pressed downward to exert the desired amount of pressure on the reinforced plastic material and to compress it into the final blade form 30, Fig. 5. The pressure and heat applied during this operation must be adequate to cause the plastic material to flow and fill all cavities between the compressed sheets of material, so that the final blade 30 is a practically homogeneous mass throughout, without voids. After the heat and pressure have been applied for the necessary length of time to form and polymerize, or to set and cool the blade 30, it is removed from the mold 26 and is now ready to be mounted by conventional means into a hub and onto the driving shaft of an aeroplane or other aircraft, balancing and polishing operations being applied if needed.

It will be understood that various modifications and changes may be made in the materials and methods of assembly described hereinabove without departing from the scope of my invention.

I claim:

1. Sheet material for forming air propeller blades comprising a web made of interwoven organic fiber warp threads and small diameter steel wire filler elements, said material being cut to a pattern adapted to distribute the mass of the material to correspond to the desired varying mass of the propeller blade and said steel wires varying in number along the length of the material such that when the material is formed into a blade the filler elements of the material in the outermost layers of the blade will be substantially all steel wires and the filler elements of the material forming the core of the blade will be substantially all organic fiber elements.

2. A material for forming an air propeller blade comprising an elongated strip of woven material decreasing in width from one end of the strip to the other, the portion of the strip having the greatest width being formed from interwoven organic fiber warp threads and steel wire filler elements, the center portion of intermediate width being formed from interwoven organic fiber warp threads and steel wire and organic fiber filler threads, and the narrowest portion of said material being formed entirely of organic fiber warp and filler threads, the length and varying width of the sheet material being adjusted to distribute the mass of the material to correspond to the varying mass of the propeller blade for which it is intended.

3. An air propeller blade comprising a plurality of rolled up sheets of plastic impregnated reinforced fabric molded together into a substantially unitary structure, each of said sheets being formed from the sheet material defined in claim 1.

4. An air propeller blade comprising a plurality of rolled up sheets of plastic-impregnated reinforced fabric molded together into a substantially unitary structure, each of said sheets being formed from the sheet material defined in claim 2.

5. A material for forming air propeller blades comprising an elongated web made up of a plurality of wires held in spaced relationship by a plurality of organic fiber threads, said web being of varying width and of a pattern suited to distribute the mass of the material to correspond generally to the desired varying cross-sections of the propeller blade from tip to tip, and the length of said web corresponding generally to the desired varying peripheries of the propeller blade, said web being coated with a synthetic resinous material and the narrow portions of the web being adapted to form a core of the propeller blade and the wider portions of the web being adapted to form the outer surface of the blade and the web having a width substantially equal to the length or height of the blade.

6. A material for forming air propeller blades as defined in claim 5, and in which the web is coated with an uncured plastic material.

7. A material for forming air propeller blades as defined in claim 5, and in which the web is coated with an uncured thermosetting phenol formaldehyde resin.

8. A material for forming air propeller blades as defined in claim 5, in which the wires are steel wires of relatively small diameter and the organic fibers are textile threads.

9. An air propeller blade comprising at least one sheet of the web material defined in claim 5, formed into the desired shape of the blade and embedded in a molded plastic material to provide a substantially unitary construction in said blade.

10. An air propeller blade comprising a plurality of pile-up preforms of the elongated webs defined in claim 5 embedded in a cured resin material and molded together into a substantially unitary structure.

11. An air propeller blade of varying peripheries and cross sections comprising a rolled up broad web of wire-reinforced fabric impregnated with a cured resinous material and molded to a hard, dense form, said web having a predetermined length and varying width to distribute the mass of the material according to the desired varying mass of the blade, the length and varying width of the web corresponding to the peripheries and cross sections respectively of the blade from tip to tip.

12. An air propeller blade of varying width and cross section made up of a preformed sheet of wire-reinforced fabric which is impregnated with a hardened plastic material and which is rolled up upon itself and molded to form the desired mass and contour of the blade, said sheet having a progressively varying width from one end to the other, the narrowest portion forming the core of the blade and the widest portion forming the outer surface of the blade and having a width substantially equal to the length of the blade.

13. An air propeller blade having varying peripheries and cross sections consisting of a plurality of superimposed layers of fabric impregnated with a synthetic resinous material, each of said layers being cut to the same pattern and being of a length and varying width of the web corresponding to the peripheries and cross sections respectively of the blade from tip to tip, said layers being rolled about their portions of narrowest width and then subjected to pressure and heat in a mold.

14. An air propeller blade having varying peripheries and cross-sections consisting of a plurality of superimposed layers of wire reinforced fabric impregnated with a plastic material each of said layers being cut to the same pattern and being of a length and varying width of the web corresponding to the peripheries and cross sections respectively of the blade from tip to tip, said layers being rolled about their portions of narrowest width and then subjected to pressure and heat in a mold.

VICTOR LOUGHEED.